US012340766B2

(12) United States Patent
Chao et al.

(10) Patent No.: US 12,340,766 B2
(45) **Date of Patent: *Jun. 24, 2025**

(54) ELECTRONIC DEVICE

(71) Applicant: InnoLux Corporation, Miao-Li County (TW)

(72) Inventors: Huang-Chi Chao, Miao-Li County (TW); Wei-Cheng Tsai, Miao-Li County (TW); Ming-Chi Weng, Miao-Li County (TW); Yu-Hsin Feng, Miao-Li County (TW); Cheng-Tso Hsiao, Miao-Li County (TW); Ming-Feng Hsieh, Miao-Li County (TW); Chien-Hung Chan, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,921

(22) Filed: Apr. 22, 2024

(65) Prior Publication Data

US 2024/0274094 A1 Aug. 15, 2024

Related U.S. Application Data

(63) Continuation of application No. 18/165,493, filed on Feb. 7, 2023, now Pat. No. 11,996,058.

(30) Foreign Application Priority Data

Mar. 23, 2022 (CN) ........................ 202210287661.1

(51) Int. Cl.
*G09G 3/34* (2006.01)
*G09G 3/32* (2016.01)

(52) U.S. Cl.
CPC ............. *G09G 3/3406* (2013.01); *G09G 3/32* (2013.01); *G09G 2310/08* (2013.01);
(Continued)

(58) Field of Classification Search
CPC ....... G09G 2310/08; G09G 2320/0257; G09G 3/3406; G09G 2320/0626; G09G 3/32; G09G 2360/16
See application file for complete search history.

(56) References Cited

U.S. PATENT DOCUMENTS

2008/0225062 A1* 9/2008 Chang .................. G09G 3/3208 345/691
2009/0267953 A1* 10/2009 Sampsell ............. G09G 3/3688 345/520
(Continued)

*Primary Examiner* — Muhammad N Edun
(74) *Attorney, Agent, or Firm* — McClure, Qualey & Rodack, LLP

(57) ABSTRACT

An electronic device is provided and includes a display panel, a light source, and a timing controller. The light source is disposed corresponding to the display panel. The timing controller is electrically connected to the display panel and the light source. The display panel refreshes a displayed content according to a first signal generated by the timing controller. The light source refreshes a brightness according to a second signal generated by the timing controller. The light source begins refreshing the brightness at a first time point. The display panel begins refreshing the displayed content at a second time point. The first time point is different from the second time point.

8 Claims, 7 Drawing Sheets

(52) U.S. Cl.
CPC ............... *G09G 2320/0257* (2013.01); *G09G 2320/0626* (2013.01); *G09G 2360/16* (2013.01)

(56) References Cited

U.S. PATENT DOCUMENTS

| | | | | |
|---|---|---|---|---|
| 2014/0267448 | A1 * | 9/2014 | Albrecht | G09G 3/3406 345/84 |
| 2015/0339994 | A1 * | 11/2015 | Verbeure | G09G 3/2003 345/214 |
| 2022/0293028 | A1 * | 9/2022 | Li | G09G 3/20 |

* cited by examiner

ELECTRONIC DEVICE

CROSS REFERENCE TO RELATED APPLICATIONS

This application is a Continuation of U.S. patent application Ser. No. 18/165,493, filed Feb. 7, 2023 (now U.S. Pat. No. 11,996,058), which claims the benefit of China Patent Application No. 202210287661.1, filed Mar. 23, 2022, the entirety of which is incorporated by reference herein.

BACKGROUND OF THE DISCLOSURE

Field of the Disclosure

The present disclosure relates to an electronic device. In particular, the present disclosure relates to an electronic device with variable-refresh-rate technology.

Description of the Related Art

Liquid-crystal displays have gradually become popular in recent years due to their light weight, low radiation, thin volume, and other advantages. However, the refresh rate of conventional liquid-crystal displays is constant. Therefore, when a liquid-crystal display shows images that are fast-changing and dynamic, this can easily cause afterimages and similar phenomena, which impacts the image quality.

BRIEF SUMMARY OF THE DISCLOSURE

According to some embodiments, an electronic device is provided. The electronic device comprises a display panel, a light source, and a timing controller. The light source is disposed corresponding to the display panel. The timing controller is electrically connected to the display panel and the light source. The display panel refreshes a displayed content according to a first signal generated by the timing controller. The light source refreshes a brightness according to a second signal generated by the timing controller. The light source begins refreshing the brightness at a first time point. The display panel begins refreshing the displayed content at a second time point. The first time point is different from the second time point.

BRIEF DESCRIPTION OF THE DRAWINGS

The present disclosure can be more fully understood by reading the subsequent detailed description and examples with references made to the accompanying drawings. It should be noted that, various features may be not drawn to scale. In fact, the dimensions of the various features may be arbitrarily increased or decreased for clarity of discussion, and the various features may be drawn schematically.

DETAILED DESCRIPTION OF THE DISCLOSURE

Figure 1:
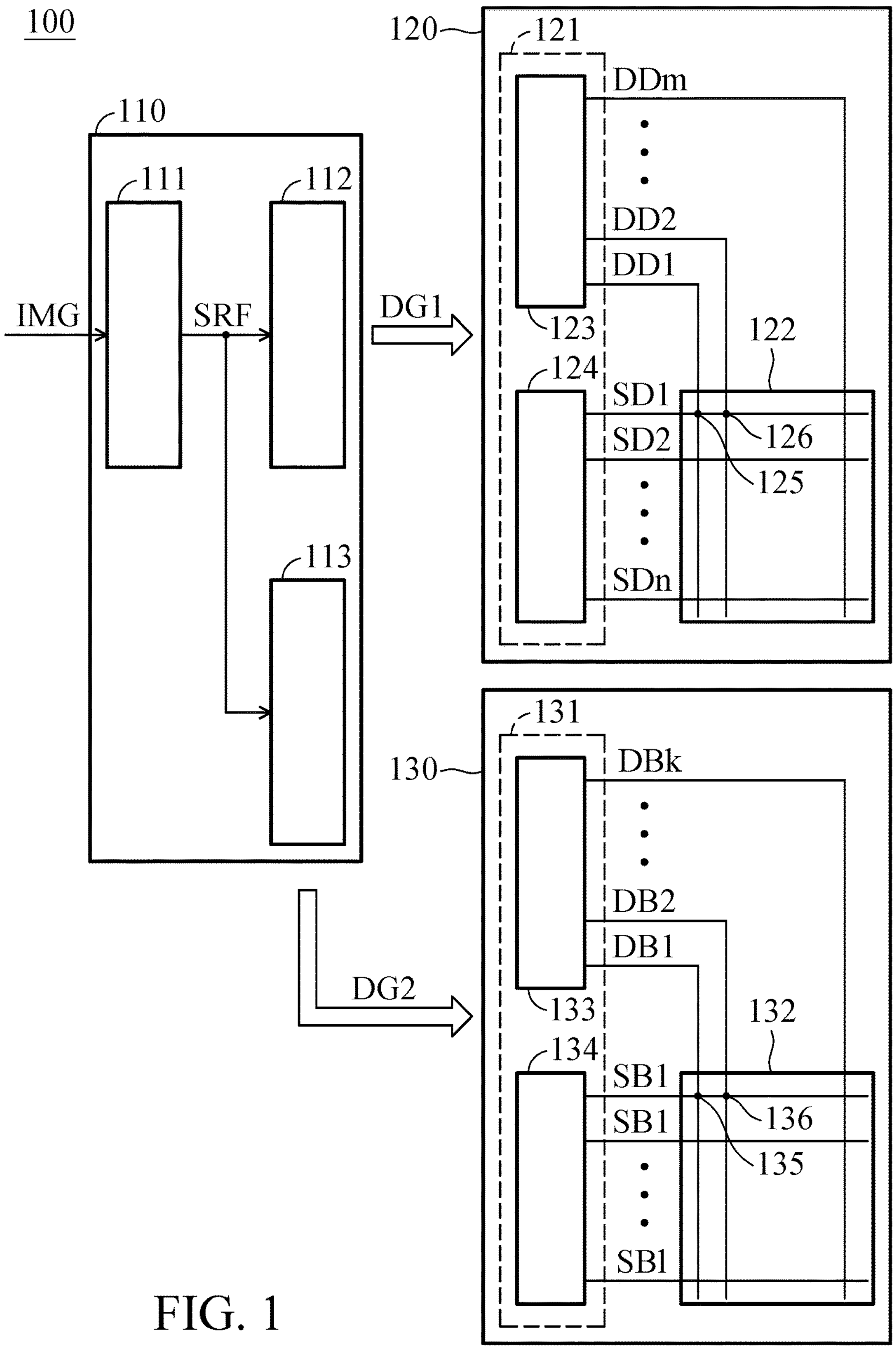
FIG. 1 is a schematic diagram showing a display device of the present disclosure.

In order to make the purpose, features and advantages of the represent disclosure more obvious and easy to understand, the following embodiments are provided and described in detail in accompany with the drawings. The description of the represent disclosure provides different embodiments to illustrate the technical features of different implementations. The arrangement of each element in the embodiments is for illustration and should not be taken to limit the present disclosure. Ordinal terms such as “first”, “second”, etc., used in the description and claims do not by themselves connote any priority, precedence, or order of one element over another element, but are used merely as labels to distinguish one element from another element having the same name. Therefore, a first element in the description may be referred to as a second element in claims. In addition, in different examples of the disclosure, similar and/or corresponding symbols or alphabets may be used repeatedly. These similar and/or corresponding symbols or alphabets are used for the sake of clear description of some embodiments of the present disclosure, and they do not dictate any relationship between different embodiments and/or structures.

The present disclosure may be understood from the following description in accompany with the drawings. In should be noted that, for simplification, in the drawings, it’s possible that only part of an electronic device is illustrated. In addition, the number and the dimensions of the elements merely serve as examples, and they are not intended to limit the scope of the present disclosure. It should be noted that, the elements and devices may exist in various forms. In the description, relative expressions may be used. For example, “above” and “below” may be used to describe the position of one element relative to another. It should be noted that, if a device of a drawing is flipped upside down, an element that is “above” a specific element will become an element that is “below” the specific element. It should be noted that, if one element or layer is referred to as being “electrically connected” to another element or layer, it can be directly or electrically connected to the other element or layer, or further another element or layer is interposed between them. Conversely, when an element or layer is “connected” to another element or layer, no element or layer is interposed between them.

In the description, the words “including”, “comprising”, “having”, and the like are open words, so they should be interpreted as meaning “including but not limited to . . . ”. Therefore, when the words “including”, “comprising”, “having”, and the like are used in the description of the present disclosure, the presence of corresponding features, regions, steps, operations and/or components is specified without excluding the presence of one or more other features, regions, steps, operations and/or components. In addition, deviation between any two numerical values or directions may exist. For example, if the first direction is described as perpendicular to the second direction, the angle between the first direction and the second direction may be between 80 degrees to 100 degrees. If the first direction is described as parallel with the second direction, the angle between the first direction and the second direction may be between 0 degrees to 10 degrees.

Unless defined otherwise, all terms (including technical and scientific terms) used herein have the same meaning as commonly understood by those skilled in the art. It should be appreciated that, the terms, which are defined in a commonly used dictionary, should be interpreted as having a meaning that conforms to the relative skills of the present disclosure and the background or the context of the present disclosure, and should not be interpreted in an idealized or overly formal manner unless so defined in some embodiments of the present disclosure.

FIG. 1 is a schematic diagram showing a display device of the present disclosure. A display device 100 comprises a timing controller 110, a display panel 120, and a backlight module 130. The present disclosure does not limit the type of the display device 100. In some embodiments, the display device 100 may be a bendable or flexible display device.

The timing controller 110 comprises a decoding unit 111, a first processing unit 112, and a second processing unit 113. The first processing unit 112 is electrically connected to the decoding unit 111 and the display panel 120. The second processing unit 113 is electrically connected to the decoding unit 111 and the backlight module 130. The timing controller 110 receives an image input IMG and generates a group of display signals DG1 and a group of brightness control signals DG2 according to the image input IMG. In some embodiments, each of the group of display signals DG1 and the group of brightness control signals DG2 comprises a plurality of control signals The display panel 120 displays images according to the group of display signals DG1. In the disclosure, the display panel 120 refreshes the displayed content according to the group of display signals DG1. Since the display device is a variable-refresh-rate display device, the display panel 120 refreshes the displayed content in a first refresh sequence according to a plurality of first refresh rates. More specifically, the first refresh rates can be the same or different refresh rates, and the process of switching the refresh rates defines the first refresh sequence. That is to say, the first refresh sequence may include multiple refresh rates, and these refresh rates may be the same or different. For example, the first refresh sequence may include at least one of the refresh rates 240 Hz, 160 Hz, 80 Hz and 48 Hz, but the present disclosure is not limited thereto. In some embodiments, the first refresh sequence may include two or more refresh rates, and the display panel 120 is referred to as a variable-refresh-rate (VRR) display. For example, the display panel 120 refreshes the displayed content according to a first refresh sequence. The first refresh sequence may be 240 Hz→120 Hz→240 Hz→120 Hz→80 Hz. In this example, the refresh rates in the first refresh sequence are part of the first refresh rates. For example, the first refresh rates may include 240 Hz, 160 Hz, 80 Hz and 48 Hz. The present disclosure does not intend to limit the type of the display panel 120. In some embodiments, the display panel 120 is a liquid-crystal display panel, but the disclosure is not limited thereto. In addition, it should be noted that the fresh rates mentioned in the disclosure are only approximate numbers and not necessarily precise values. For example, when it is mentioned that "the display panel 120 refreshes the display content at 240 Hz", it may mean that the display panel refreshes the displayed content at a refresh rate close to 240 Hz (for example, 235 Hz to 245 Hz).

In the embodiment, the display panel 120 comprises a display controller 121 and a display array 122. The display controller 121 is electrically connected between the first processing unit 112 of the timing controller 110 and the display array 122. The display controller 121 refreshes the content displayed by the display array 122 according to the group of display signals DG1. In some embodiments, the display controller 121 comprises a source driver 123 and a gate driver 124.

The gate driver 124 generates a plurality of scan signals SD1-SDn according to the group of display signals DG1. The source driver 123 generates a plurality of data signals DD1-DDm according to the group of display signals DG1. The display array 122 receives the scan signals SD1-SDn and the data signals DD1-DDm.

The display array 122 comprises a plurality of pixels. One pixel displays a corresponding image according to a scan signal and a data signal. Taking the pixels 125 and 126 as an example, the pixel 125 receives the data signal DD1 according to the scan signal SD1 and displays a corresponding image according to the data signal DD1. The pixel 126 that is adjacent to the pixel 125 receives the data signal DD2 according to the scan signal SD1 and displays a corresponding image according to the data signal DD2.

The backlight module 130 emits light according to the group of brightness control signal DG2. Specifically, the backlight module 130 comprises a light source controller 131 and a light source 132. The light source 132 is disposed adjacent to the display panel 120, and the light source controller 131 is electrically connected between the second processing unit 113 of the timing controller 110 and the light source 132. In the disclosure, the light source controller 131 generates a driving signal according to the group of brightness control signals DG2, and the light source 132 refreshes the brightness according to the driving signal. According to the group of brightness control signals DG2, the light source 132 refreshes the brightness in a second refresh sequence according to a plurality of second refresh rates. More specifically, the second refresh rates can be the same or different refresh rates, and the process of switching the refresh rates defines the second refresh sequence. In the present disclosure, each of the first refresh sequence and the second refresh sequence may include multiple refresh rates, and the second refresh sequence may be the same as or different from the first refresh sequence. For example, in cases where the second refresh sequence is the same as the first refresh sequence, when the display panel 120 refreshes the displayed content with a refresh rate of 240 Hz, the light source 132 also refreshes the brightness by a refresh rate of 240 Hz. When the display panel 120 refreshes the displayed content with a refresh rate of 120 Hz, the light source 132 also refreshes the brightness with a refresh rate of 120 Hz.

The present disclosure does not limit the structure of the backlight module 130. In some embodiments, the backlight module 130 may be an active matrix light-emitting diode backlight module (AM-LED backlight), but the disclosure is not limited thereto. In some embodiments, the light source controller 131 may comprise a first driver 133 and a second driver 134. In some embodiments, the light source controller 131 may comprise only one of the first driver 133 and the second driver 134.

The second driver 134 generates a plurality of scan signals SB1 according to the group of brightness control signals DG2. The first driver 133 generates a plurality of data signals DB1-DBk according to the group of brightness control signals DG2. The light source 132 receives the scan signals SB1 and the data signals DB1-DBk.

In some embodiments, the light source 132 comprises a plurality of light-emitting units. In the present disclosure, each light-emitting unit may comprise a light-emitting diode (LED) and a corresponding circuit, however, the present disclosure is not limited thereto. Each light-emitting units emits light according to a scan signal and a data signal. For example, the light-emitting unit 135 receives the data signal DB1 according to the scan signal SB1 and emits light according to the data signal DB1. The light-emitting unit 136 receives the data signal DB2 according to the scan signal SB1 and emits light according to the data signal DB2. In the present disclosure, the light-emitting diodes may include organic light-emitting diodes (OLEDs), submillimeter light-emitting diodes (mini LEDs), micro light-emitting diodes (micro LEDs), or quantum dot light-emitting diode (QLED/QDLED). The materials of the light-emitting diodes may be fluorescence, phosphor. or other suitable materials, and the materials may be arranged in any combination, but the disclosure is not limited thereto.

In some embodiments, the number of light-emitting units of the light source 132 may be less than the number of pixels of the display array 122. In other words, in some embodiments, one light-emitting unit of the light source 132 may correspond to one or more pixels of the display array 122. Therefore, when a specific light-emitting unit of the light source 132 is turned on, the light emitted by the specific light-emitting unit passes through one or more pixels of the display array 122.

Figure 2A:
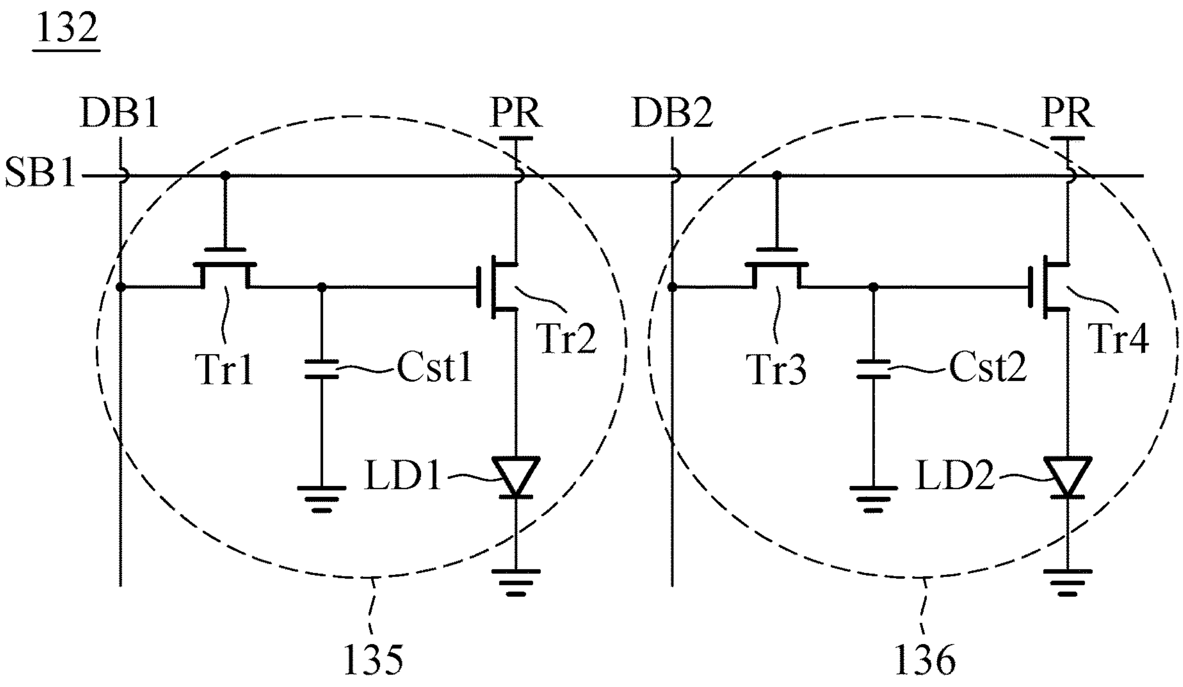
FIG. 2A is one schematic diagram showing light-emitting units of a light source.

FIG. 2A is one schematic diagram showing the light-emitting units 135 and 136 of the light source 132. The light-emitting unit 135 comprises transistors Tr1 and Tr2, a storage capacitor Cst1, and a light-emitting diode LD1. The control terminal of the transistor Tr1 receives the scan signal SB1, the first terminal thereof receives the data signal DB1, and the second terminal thereof is electrically connected to the control terminal of the transistor Tr2 and the storage capacitor Cst1. The first terminal of the transistor Tr2 receives a power source PR, and the second terminal thereof is electrically connected to the light-emitting diode LD1. The light-emitting unit 136 comprises transistors Tr3 and Tr4, a storage capacitor Cst2, and a light-emitting diode LD2. The control terminal of the transistor Tr3 receives the scan signal SB1, the first terminal thereof receives the data signal DB2, and the second terminal thereof is electrically connected to the control terminal of the transistor Tr4 and the storage capacitor Cst2. The first terminal of the transistor Tr4 receives the power source PR, and the second terminal thereof is electrically connected to the light-emitting diode LD2.

Taking the light-emitting unit 135 as an example, when the scan signal SB1 is enabled, the transistor Tr1 is turned on. The transistor Tr2 controls the electrical connection between the power source PR and the light-emitting diode LD2 according to the data signal DB1. For example, when the data signal DB1 is at a high level, the transistor Tr2 is turned on so that the current provided by the power source PR flows to the light-emitting diode LD1. The light-emitting diode LD1 emits light according to the current flowing it. At this time, the storage capacitor Cst1 stores the data signal DB1. When the transistor Tr1 is not turned on, the transistor Tr2 is turned on according to the voltage of the storage capacitor Cst1.

In the embodiment, the light source controller 131 controls the light source 132 in a local dimming manner. In the embodiment, the light source controller 131 adjusts the magnitude of each of the currents flowing through the light-emitting units of the light source 132 to individually control the brightness of the individual light-emitting units. However, the present disclosure does not limit how the light source controller 131 controls the brightness of the light source 132.

Figure 2B:
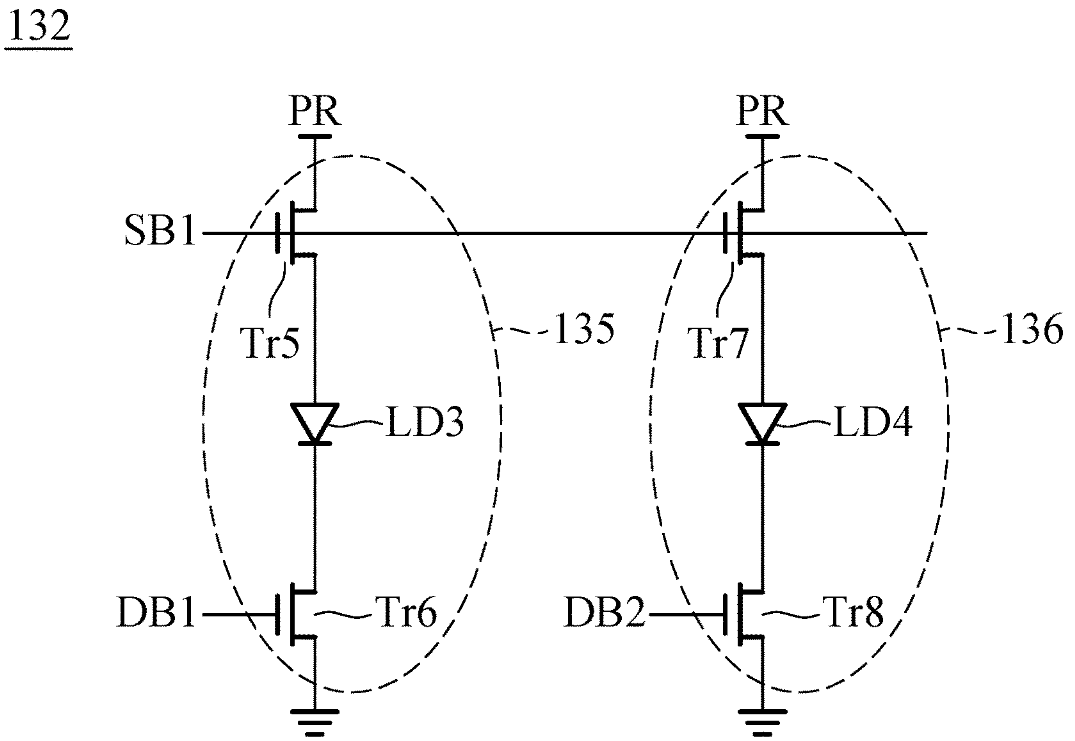
FIG. 2B is another schematic diagram showing light-emitting units of a light source.

In other embodiments, the light source controller 131 controls the brightness of the light source 132 in a sequential scanning manner. FIG. 2B is another schematic diagram showing the light-emitting units 135 and 136 of the light source 132. The light-emitting unit 135 comprises transistors Tr5 and Tr6 and a light-emitting diode LD3. The control terminal of the transistor Tr5 receives the scan signal SB1, the first terminal thereof receives the power source PR, and the second terminal thereof is electrically connected to the anode of the light-emitting diode LD3. The control terminal of the transistor Tr6 receives the data signal DB1, the first terminal thereof is electrically connected to the cathode of the light-emitting diode LD3, and the second terminal thereof is electrically connected to the ground. The light-emitting unit 136 comprises transistors Tr7 and Tr8 and a light-emitting diode LD4. The control terminal of the transistor Tr7 receives the scan signal SB1, the first terminal thereof receives the power source PR, and the second terminal thereof is electrically connected to the anode of the light-emitting diode LD4. The control terminal of the transistor Tr8 receives the data signal DB2, the first terminal thereof is electrically connected to the cathode of the light-emitting diode LD4, and the second terminal thereof is electrically connected to the ground.

In the embodiment, the scan signals SB1 generated by the light source controller 131 may be pulse width modulation (PWM) signals. The light-emitting units of the light source 132 flicker according to the duty ratios (that is, a duty ratio is a ratio of the time of turning on the corresponding transistors to make the currents flow through the light-emitting units to the time of turning off the corresponding transistors) in the pulse width modulation signals. For example, when a pulse width modulation signal is at a high level, the transistors Tr5 and Tr7 are turned on, and the light source 132 emits light due to the currents flowing through the light-emitting units. When the pulse width modulation signal is at a low level, the transistors are turned off so that the light source 132 does not emit light. In addition, since the length of time that light is emitted is related to the duty ratios, the total brightness perceived by the human eye will vary with the duty ratios. For example, when the duty ratios of the pulse width modulation signals are 70%, the brightness perceived by the human eye will be obviously brighter than the perceived brightness when the duty ratios of the pulse width modulation signals are 30%. The purpose of flickering is to improve the fluency of dynamic images and reduce afterimages when images are displayed.

Taking the light-emitting unit 135 as an example, when the scan signal SB1 is enabled, the transistor Tr5 is turned on. Therefore, the anode of the light-emitting diode receives the current from the power source PR so that the light-emitting diode LD3 can emit light. More specifically, the corresponding scan signal SB1 is the aforementioned pulse width modulation signal. Thus, the time of turning on the transistor Tr5 is determined according to the duty ratio of the pulse width modulation signal, which causes the light-emitting unit 135 to flicker, thereby achieving better effect of dynamic images effect or reduce afterimage phenomenon. In addition, the conduction degree of the transistor Tr6 can be controlled by the data signal DB1. For example, when the data signal DB1 is at a high level, the conduction degree of the transistor Tr6 is relatively level, and the current flowing through the light-emitting diode LD3 is relatively high so that the brightness of the light-emitting diode LD3 is increased. In the embodiment, by controlling the conduction degree of the transistor Tr6, the brightness of the light-emitting diode LD3 can also be controlled. In other words, in the embodiment shown in FIG. 2B, the effect of dynamic images can be improved using the pulse width modulation signals as the scanning signals, and the brightness of the individual light-emitting units can be further controlled by adjusting individual data signals. For clarity of description, when the embodiment using the circuit of FIG. 2B is discussed later, only the variation of the pulse width modulation signals will be discussed, but the brightness variation between individual light-emitting units will not be discussed. In some embodiments, the light-emitting units 135 and 136 may not comprise the transistors Tr6 and Tr8 shown in FIG. 2B, and the light source controller 131 may not comprise the first driver 133. In other words, the light source 132 only receives the pulse width modulation signals from the second driver 134.

Please refer to FIG. 1, the second processing unit 113 is electrically connected to the light source controller 131. In some embodiments, the decoding unit 111 receives an image input IMG and then decodes it to provide a refresh signal SRF to the first processing unit 112 and the second processing unit 113. The display panel 120 refreshes the displayed content according to multiple refresh rates, and the light source 132 refreshes the brightness according to multiple refresh rates. The process of switching the refresh rates for refreshing the displayed content of the display panel 120 defines the first refresh sequence, and the process of switching the refresh rates for refreshing the brightness of the light source 132 defines the second refresh sequence.

In some embodiments, the first processing unit 112 generates the group of display signals DG1 according to the refresh signal SRF to instruct the display panel 120 to refresh the displayed content. In this example, the second processing unit 113 generates the group of brightness control signals DG2 according to the refresh signal SRF to instruct the light source 132 to refresh the brightness.

In some embodiments, the group of brightness control signals DG2 comprises a brightness signal. The light source controller 131 generates a driving signal according to the brightness signal and begins refreshing the brightness of the light source 132 at a first time point so that the light source 132 can provide light with a first brightness. In the example, the group of display signals DG1 comprises an image signal. The display panel 120 begins refreshing the content displayed on the display panel 120 at a second time point according to the image signal to display a first image. In some embodiments, the first brightness corresponds to the first image, and the first time point is later than the second time point. For example, in some embodiments, the interval between the second time point and the first time point is equal to a frame time. In some other embodiments, the interval between the second time point and the first time point is shorter than a frame period. It should be noted that, in the present disclosure, the frame period refers to the time interval between the time point when one image is displayed on the display panel 120 and the time point when the next image is displayed on the display panel 120, and the refresh rate of the displayed content is the reciprocal of the frame period. For example, when a refresh rate is 60 Hz, the corresponding frame period is $\frac{1}{60}$ seconds.

In addition, the "first brightness" mentioned in the preceding paragraph indicates the brightness distribution of all the light-emitting units in the light source 132. The term "the first brightness corresponds to the first image" mentioned in the preceding paragraph means that when different regions of the first image have different brightness, different light-emitting units at the corresponding positions on the light source 132 have different brightness. For example, when sunlight and shadows appear in the first image at the same time, for the first brightness, the brightness of the light-emitting units corresponding to the sunlight is higher, while the brightness of the light-emitting units corresponding to the shadows is lower.

Figure 3:
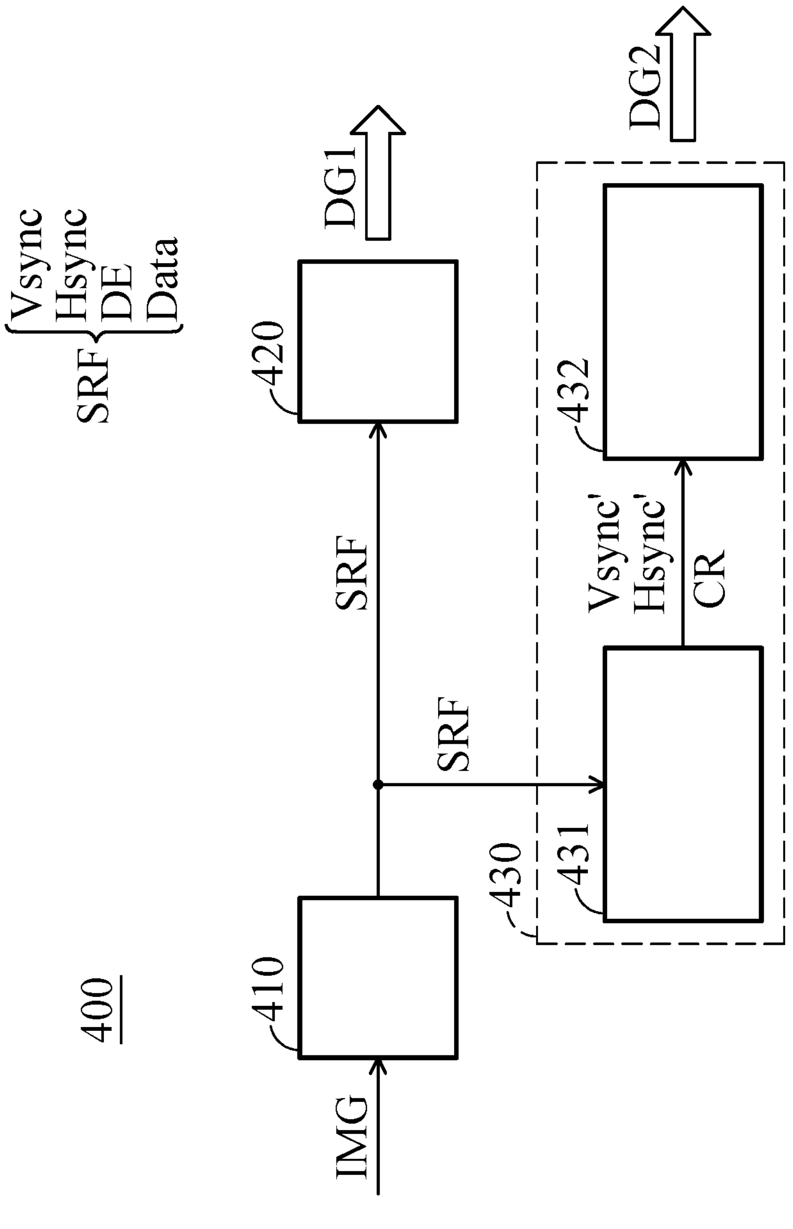
FIG. 3 is one schematic diagram showing of a timing controller of the present disclosure.
Figure 4A:
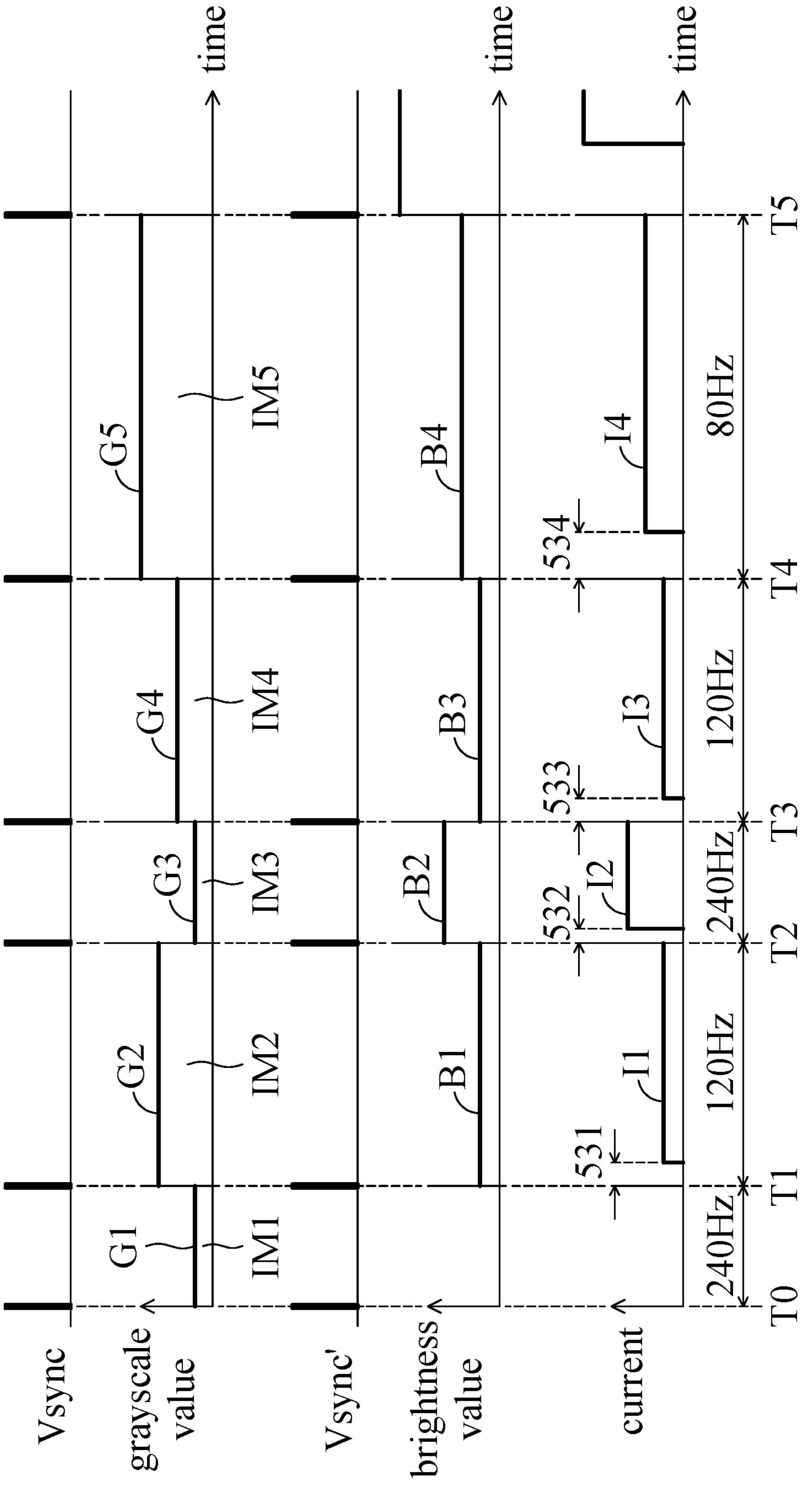
FIG. 4A is one schematic diagram showing refresh sequences of a display panel and a backlight module of the present disclosure.

Please refer to FIG. 3 and FIG. 4A. FIG. 3 is one schematic diagram showing of the timing controller of the present disclosure, and FIG. 4A is one schematic diagram showing the refresh sequences of the display panel and the backlight module of the present disclosure. It should be noted that the changes in the refresh frequencies, grayscale values and brightness shown in FIG. 4A are as example, and the present disclosure is not limited thereto. Moreover, for clarity of description, FIG. 4A corresponds to the case where the display panel 120 displays single-color images, that is, in the embodiment, the difference between the images displayed on the display panel 120 in different frame periods is the difference in grayscale values. The images displayed on the display panel 120 are not complex images. Therefore, although the light source 132 corresponding to the display panel 120 may provide different brightness at different times, the brightness emitted by respective light-emitting units at the same time is the same. If the display panel 120 displays relatively complex images, FIG. 4A corresponds to the grayscale values of a specific region of the image and the brightness values of the light-emitting units corresponding to the specific regions.

As shown in FIG. 3, the timing controller 400 comprises a decoding unit 410 and processing units 420 and 430. The decoding unit 410 decodes the image input IMG to generate the refresh signal SRF. In the embodiment, the refresh signal SRF comprises a vertical synchronization signal Vsync, a horizontal synchronization signal Hsync, a data enable signal DE, and data Data. The disclosure does not intend to limit the circuit structure of the decoding unit 410. Any circuit that can decode images signals can be implemented as the decoding unit 410.

The processing unit 420 generates the group of display signals DG1 corresponding to the current frame period according to the refresh signal SRF and provides it to the display panel 120. In this example, the display panel 120 displays one image according to one piece of the image data of the group of display signals DG1. The present disclosure does not limit the circuit structure of the processing unit 420. Any circuit structure capable of driving the display panel 120 can be implemented as the processing unit 420.

The processing unit 430 generates the group of brightness control signals DG2 according to the refresh signal SRF and provides it to the backlight module 130. As mentioned above, the light source 132 refreshes the brightness according to the group of brightness control signals DG2. In the embodiment, the processing unit 430 comprises a calculation circuit 431 and a variable-refresh-rate circuit 432.

The calculation circuit 431 receives and performs a calculation on the data Data to generate a calculation result CR. The calculation circuit 431 further provides a vertical synchronization signal Vsync' and a horizontal synchronization signal Hsync'. Since the resolution of the light source 132 (the arrangement density of the light-emitting units) may be different from the resolution of the display panel 120, the calculation circuit 431 provides the horizontal synchronization signal Hsync' to the variable-refresh-rate circuit 432. In this example, the frequency of the horizontal synchronization signal Hsync' may be less than the frequency of the horizontal synchronization signal Hsync. It should be noted that, in one embodiment, in order to achieve the refreshing of the brightness of the light source 132, the calculation circuit 431 directly uses the vertical synchronization signal Vsync as the vertical synchronization signal Vsync' so that the refresh rate used to refresh the brightness of the light source 132 is equal to the refresh rate used to refresh the displayed content of the display panel 120.

However, in the embodiment, the calculation result CR corresponds to the image data that is used to drive the display panel 120 during the previous frame period. More specifically, in the embodiment, the processing unit 420 begins to instruct the display panel 120 to refresh the displayed content when it obtains only a part of the pixel data, but the processing unit 430 begins calculating the required brightness data of the light source 132 after it obtains the whole data of the image. Therefore, the calculation result CR for the current image cannot be generated synchronously with the current image data of the display panel 120. In the embodiment, the calculation circuit 431 may comprise a memory (not shown), and the calculation result CR corresponding to the image data of the previous frame period used to drive the display panel 120 is pre-stored in the memory. When the variable-refresh-rate circuit 432 receives the vertical synchronization signal Vsync', the calculation circuit 431 transmits the calculation result CR to the variable-refresh-rate circuit 432 and stored a new calculation result CR in the memory. Thus, the group of brightness control signals DG2 corresponds to the image data in the previous frame period. In other words, in the embodiment, the brightness of the light source 132 can be refreshed synchronously with the displayed content of the display panel 120, but the brightness distribution of the light source 132 corresponds to the image data in the previous frame period.

Referring to FIG. 4A, the vertical synchronization signal Vsync is enabled at the time points T0~T5. Therefore, the display panel 120 displays images IM1~IM5 respectively. According to the first refresh sequence of the display panel 120, the refresh rates for refreshing the content displayed on the display pane 120 are 240 Hz, 120 Hz, 240 Hz, 120 Hz, and 80 Hz in sequence.

During the period between the time points T0 and T1, the display panel 120 displays an image IM1. At this time, the refresh rate of the display panel 120 is 240 Hz, and the grayscale value of the image IM1 of the display panel 120 is G1. In the embodiment, when the vertical synchronization signal Vsync is enabled, the vertical synchronization signal Vsync' is also enabled so that the backlight module 130 begins operating according to the group of brightness control signals DG2. However, as mentioned above, when the brightness of the light source 132 is refreshed synchronously with the refreshing of the displayed content of the display panel 120, the brightness distribution of the light source 132 corresponds to the image data in the previous frame period. During the period between the time points T0 and T1, the calculation circuit 431 has no calculation result CR that was stored in advance. Thus, the variable-refresh-rate circuit 432 cannot drive the light source 132 temporarily as shown in FIG. 4A, or the light source 132 emits light with a preset brightness distribution. That is, during the period between the time points T0 and T1, the magnitude of the current flowing through the light source 132 can be 0 or at least a preset value.

During the period between the time points T1 and T2, the display panel 120 displays an image IM2. At this time, the refresh rate of the display panel 120 is 120 Hz, and the grayscale values of the image IM2 of the display panel 120 is G2. At this time, the calculation circuit 431 has already stored the calculation result CR corresponding to the previous image IM1 in the memory. Thus, the brightness unit 430 provides the group of brightness control signals DG2 to the backlight module 130 to refresh the brightness according to the calculation result CR corresponding to the image IM1. At this time, the current flowing through the light source 132 has a current value I1, and the brightness of the light source 132 during the period between the time points T1 and T2 has a brightness value B1. As mentioned above, in the embodiment, the brightness of the light source 132 corresponds to the image data in the previous frame period, so the brightness value B1 corresponds to the image IM1. It should be noted that the period for refreshing the brightness of the light source 132 may comprise a writing period and a maintaining period. During the writing period, the processing unit 430 provides a brightness signal to the backlight module 130 through the group of brightness control signals DG2 so that the light source 132 reaches a specific brightness. During the maintaining period, the brightness of the light source 132 is kept (not changed). In the represent disclosure, the maintaining period is also referred to as a blanking time. In addition, since the brightness perceived by the human eye is an integral value over time. Although no current flows into the light source 132 during the writing period, the brightness that is perceived by the human eye during the entire brightness refresh period can be still kept at the specified brightness.

During the period between the time points T2 and T3, the display panel 120 displays an image IM3. At this time, the refresh rate of the display panel 120 is 240 Hz, and the grayscale values of the image IM3 of the display panel 120 is G3. As mentioned above, during a writing period 532, the processing unit 430 provides the group of brightness control signals DG2 to the backlight module 130 according to the calculation result CR corresponding to the image IM2 to refresh the brightness. At this time, the current flowing through the light source 132 has a current value I2, the brightness of the light source 132 during the period between the time points T2 and T3 has a brightness value B2, and the brightness value B2 corresponds to the image IM2.

During the period between the time points T3 and T4, the display panel 120 displays an image IM4. At this time, the refresh rate of the display panel 120 is 120 Hz, and the grayscale values of the image IM4 of the display panel 120 is G4. Similarly, during a writing period 533, the processing unit 430 provides the group of brightness control signals DG2 to the backlight module 130 according to the calculation result CR corresponding to the image IM3 to refresh the brightness. At this time, the current flowing through the light source 132 has a current value I3, the brightness of the light source 132 during the period between the time points T3 and T4 has a brightness value B3, and the brightness value B3 corresponds to the image IM3.

During the period between the time points T4 and T5, the display panel 120 displays an image IM5. At this time, the refresh rate of the display panel 120 is 80 Hz, and the grayscale values of the image IM5 of the display panel 120 is G5. Similarly, during a writing period 534, the processing unit 430 provides the group of brightness control signals DG2 to the backlight module 130 according to the calculation result CR corresponding to the image IM3 to refresh the brightness. At this time, the current flowing through the light source 132 has a current value I4, the brightness of the light source 132 during the period between the time points T4 and T5 has a brightness value B4, and the brightness value B4 corresponds to the image IM4. The refreshing of the displayed content and the refreshing of the brightness at subsequent time points can be achieved in the similar way.

According to the above refreshing manner, the display panel 120 and the light source 132 can refresh the displayed content and brightness according to the variable refresh rates respectively, and the second refresh sequence defined by the process of switching the refresh rates for the brightness of the light source 132 are 120 Hz, 240 Hz, 120 Hz and 80 Hz, which is the same as the first refresh sequence.

It can be known from FIG. 4A that before the brightness of the light source 132 is refreshed, the current flowing through the light source 132 (more specifically, the current flowing through the light-emitting units of the light source 132) has a first current value, and, thus, the light source 132 provides first brightness. After the brightness of the light source 132 is refreshed, the current flowing through the light source 132 has a second current value, and, thus, the light source 132 provides second brightness. In the embodiment, when the first current value is different from the second current value, the first brightness is different from the second brightness. In other words, the value of the current flowing through the light source 132 before the brightness is refreshed may be different from that after the brightness is refreshed. In addition, in the embodiment, the length of the writing period in each brightness refresh period can be adjusted according to requirements. For example, the ratio between the length of the writing period and the length of the maintaining period is kept the same in each brightness refresh period so that the light source 132 can keep approximately the same brightness for the images corresponding to the same grayscale value under different brightness refresh rates.

It is considered that the processing unit 430 needs to obtain the data of the entire image before it begins calculating the brightness data required by the light source 132. Therefore, in other embodiments, the calculation circuit 431 delays the vertical synchronization signal Vsync to generate the vertical synchronization signal Vsync', and the brightness of the light source 132 is refreshed according to the vertical synchronization signal Vsync' after the calculation result CR is generated. Therefore, in the embodiments, the time of refreshing the brightness of the light source 132 is different from the time of refreshing the displayed content of the display panel 120, but the brightness of the light source 132 corresponds to the image data in the current frame period.

Figure 4B:
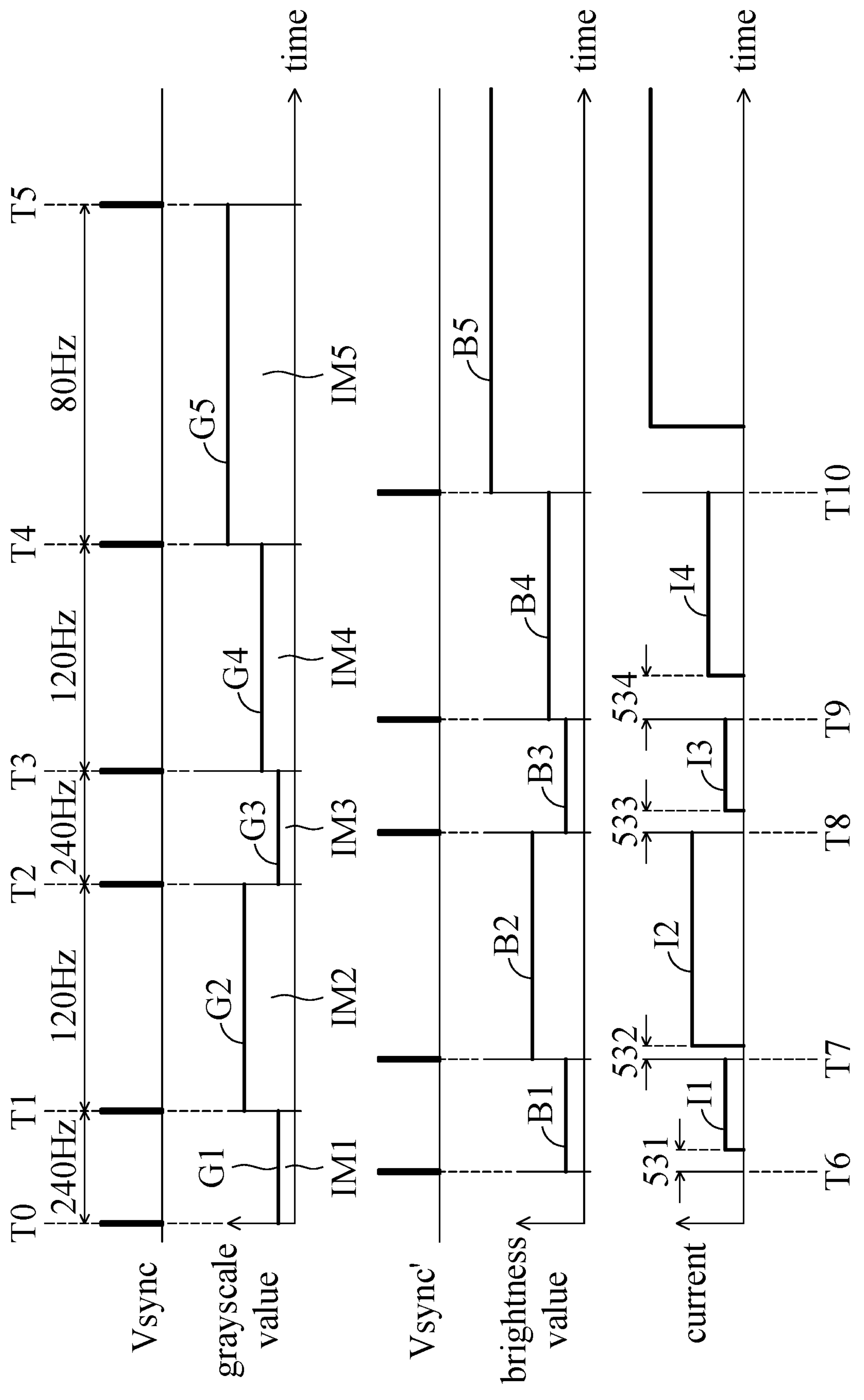
FIG. 4B is another schematic diagram showing refresh sequences of a display panel and a backlight module of the present disclosure.

Please refer to FIG. 3 and FIG. 4B. FIG. 4B is another schematic diagram showing the refresh sequences of the display panel and the backlight module of the present disclosure. FIG. 4B is similar to FIG. 4A. For clarity of description, FIG. 4B corresponds to the case where the display panel 120 displays single-color images, that is, in the embodiment, the difference between the images displayed on the display panel 120 in different frame periods is the difference in grayscale values. The images displayed on the display panel 120 are not complex images. Therefore, although the light source 132 corresponding to the display panel 120 may provide different brightness at different times, the brightness emitted by respective light-emitting units at the same time is the same. If the display panel 120 displays relatively complex images, FIG. 4B corresponds to the grayscale values of a specific region of the image and the brightness values of the light-emitting units corresponding to the specific regions.

As shown in FIG. 4B, the vertical synchronization signal Vsync is enabled respectively at the time points T0~T5. Therefore, the display panel 120 displays the images IM1-IM5 sequentially. When the display panel 120 displays the image IM1, the grayscale value of the image IM1 is G1. When the display panel 120 displays the image IM2, the grayscale value of the image IM2 is G2. When the display panel 120 displays the image IM3, the grayscale value of the image IM3 is G3. When the display panel 120 displays the image IM4, the grayscale value of the image IM4 is G4. When the display panel 120 displays the image IM5, the gray scale value of the image IM5 is G5.

As mentioned above, in the embodiment, the calculation circuit 431 delays the vertical synchronization signal Vsync to generate the vertical synchronization signal Vsync'. Once the calculation circuit 431 generates the calculation result CR, the variable-refresh-rate circuit 432 provides the group of brightness control signals DG2 for refreshing the brightness of the light source 132. Therefore, the time gap between the time point when the display panel 120 displays the image and the time point when the light source 132 provides the corresponding brightness can be shortened. In some embodiments, the delay time of the vertical synchronization signal Vsync' may be equal to or shorter than one frame period.

As shown in FIG. 4B, due to the time delay between the vertical synchronous signal Vsync' and the vertical synchronous signal Vsync, the calculation circuit 431 performs the calculation based on the image data of the image IM1 between the time points T0 and T6. At this time, since the calculation circuit 431 has not yet generated the calculation result CR, the light source 132 does not emit light temporarily or emits light according to a preset brightness distribution. At the time point T6, the calculation circuit 431 generates the calculation result CR, and the vertical synchronization signal Vsync' is enabled. Therefore, during a writing period 531, the processing unit 430 provides the group of brightness control signals DG2 to the backlight module 130 according to the calculation result CR corresponding to the image IM1 to refresh the brightness. In this case, the current flowing through the light source 132 has a current value I1, the brightness of the light source 132 between the time points T6 and T7 as a brightness value B1, and the brightness value B1 corresponds to the image IM1 displayed on the display panel 120.

At the time point T1, the vertical synchronization signal Vsync is enabled. Therefore, the display panel 120 begins displaying the image IM2, and the calculation circuit 431 performs the calculation according to the image data of the image IM2. Since the vertical synchronous signal Vsync' is delayed and the calculation circuit 431 has not generated a new calculation result CR at this time, the brightness of the light source 132 is still kept at the brightness value B1. At the time point T7, the calculation circuit 431 generates a new calculation result CR and the vertical synchronization signal Vsync' is enabled. Therefore, during a writing period 532, the processing unit 430 provides the group of brightness control signals DG2 to the backlight module 130 according to the calculation result CR corresponding to the image IM2 to refresh the brightness. In this case, the current flowing through the light source 132 has a current value I2, the brightness of the light source 132 between the time points T7 and T8 has a brightness value B2. The brightness value B2 corresponds to the image IM2 displayed on the display panel 120.

At the time point T2, the vertical synchronization signal Vsync is enabled. Therefore, the calculation circuit 431 performs the calculation according to the image data of the image IM3. Since the vertical synchronous signal Vsync' is delayed and the calculation circuit 431 has not generated a new calculation result CR at this time, the brightness of the light source 132 is still kept at the brightness value B2. At the time point T8, the calculation circuit 431 generates a new calculation result CR and the vertical synchronization signal Vsync' is enabled. Therefore, during a writing period 533, the processing unit 430 provides the group of brightness control signals DG2 to the backlight module 130 according to the calculation result CR corresponding to the image IM3 to refresh the brightness. In this case, the current flowing through the light source 132 has a current value I3, the brightness of the light source 132 between the time points T8 and T9 has a brightness value B3. The brightness value B3 corresponds to the image IM3 displayed on the display panel 120.

At the time point T3, the vertical synchronization signal Vsync is enabled. Therefore, the calculation circuit 431 performs the calculation according to the image data of the image IM4. Since the vertical synchronous signal Vsync' is delayed and the calculation circuit 431 has not generated a new calculation result CR at this time, the brightness of the light source 132 is still kept at the brightness value B3. At the time point T9, the calculation circuit 431 generates a new calculation result CR and the vertical synchronization signal Vsync' is enabled. Therefore, during a writing period 534, the processing unit 430 provides the group of brightness control signals DG2 to the backlight module 130 according to the calculation result CR corresponding to the image IM4 to refresh the brightness. In this case, the current flowing through the light source 132 has a current value I4, the brightness of the light source 132 between the time points T9 and T10 has a brightness value B4. The brightness value B4 corresponds to the image IM4 displayed on the display panel 120. The refreshing of the displayed content and the refreshing of the brightness at subsequent time points can be achieved in the similar way.

In the embodiment, since there is a time difference between the vertical synchronous signal Vsync corresponding to the display panel 120 and the vertical synchronous signal Vsync' corresponding to the backlight module 130, the calculation circuit 431 receives the data of the entire image during this time difference and calculates the brightness data required by the light source 132. When the calculation circuit 431 completes the calculation and the vertical synchronous signal Vsync' is enabled, the variable-refresh-rate circuit 432 immediately sends a backlight driving signal corresponding to the image displayed on the display panel 120 (that is, the group of brightness control signals DG2) to refresh the brightness of the light source 132. The brightness of the light source 132 is kept until the brightness of the light source 132 is refreshed again. In some embodiments, when the time difference between the vertical synchronization signal Vsync corresponding to the display panel 120 and the vertical synchronization signal Vsync' corresponding to the backlight module 130 is a fixed value, it can be deduced that the first refresh sequence of the display panel 120 and the second refresh sequence of the light source 132 is the same. For example, in the embodiment, the refresh sequence of the display panel 120 is 240 Hz, 120 Hz, 240 Hz, 120 Hz, and 80 Hz, and the refresh sequence of the light source 132 is also 240 Hz, 120 Hz, 240 Hz, 120 Hz, and 80 Hz. In some other embodiments, the time difference between the vertical synchronous signal Vsync corresponding to the display panel 120 and the vertical synchronous signal Vsync' corresponding to the backlight module 130 is determined based on the time required to generate the calculation result CR instead of the constant. The first refresh sequence and the second refresh sequence of light sources 132 may be similar but not identical.

Figure 5:
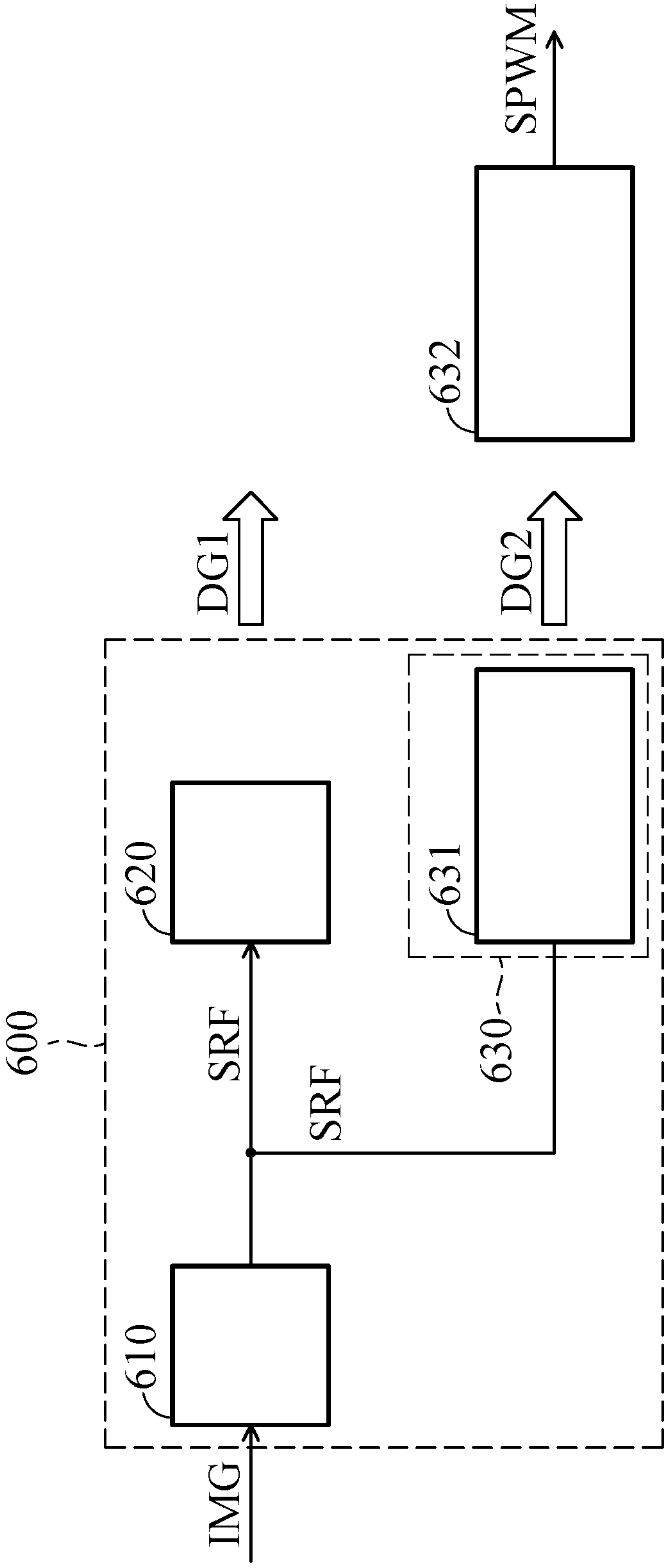
FIG. 5 is another schematic diagram showing of a timing controller of the present disclosure.

FIG. 5 is another schematic diagram showing of the timing controller of the present disclosure. The timing controller 600 comprises a decoding unit 610 and processing units 620 and 630. The decoding unit 610 decodes the image input IMG to generate the refresh signal SRF. Since the operation or function of the decoding unit 610 is similar to that of the decoding unit 410 in FIG. 3, the details are not repeated here.

The processing unit 620 generates the group of display signals DG1 and provides it to the display panel 120 according to the refresh signal SRF. In this example, the display panel 120 displays one image according to one piece of the image data of the group of display signals DG1. Since the operation or function of the processing unit 620 is similar to that of the processing unit 420 in FIG. 3, and the details are not repeated here.

In the embodiment, the processing unit 630 is electrically connected to a light source controller 632 and comprises a variable-refresh-rate circuit 631. The variable-refresh-rate circuit 631 generates the group of brightness control signals DG2 according to the refresh signal SRF. In the example, the group of brightness control signals DG2 comprises a brightness signal. The light source controller 632 generates a pulse width modulation signal SPWM (such as the scan signal SB1 shown in FIG. 2B) to refresh the brightness of the light source 132 according to the brightness signal.

In the embodiment, the light source controller 632 is independent from the timing controller 600 and is electrically connected between the timing controller 600 and the light source 132. In some other embodiments, the light source controller 632 may be integrated in the variable-refresh-rate circuit 631.

In this embodiment, the display panel 120 has a maximum panel frequency that is the highest image refresh rate the display panel 120 can achieve. The pulse width modulation signal SPWM for driving the light source 132 comprises a first pulse width modulation signal SPWM1 with a first frequency and a second pulse width modulation signal SPWM2 with a second frequency. The first frequency can be the highest panel frequency of the display panel 120, and the second frequency can be higher than the first frequency. The light source controller 632 is set to the operation "when the image refresh rate is lower than the highest panel frequency of the display panel 120, during the frame period, the brightness refresh signal of the light source 132 is a combination of one pulse of the first pulse width modulation signal SPWM1 and one or more pulses of the second pulse width modulation signals SPWM2". More specifically, when the display panel 120 refreshes the displayed content, the light source controller 632 initially generates one pulse of the first pulse width modulation signal SPWM1. When the refresh rate of the display panel 120 becomes low to cause that the next image is displayed after the time of the pulse of the first pulse width modulation signal SPWM1 has elapsed, the light source controller 632 will successively generate one or more pulses of the second pulse width modulation signal SPWM2 until the display panel 120 refreshes the displayed content. For clarity of description, in the embodiment, for each of the first pulse width modulation and the second pulse width modulation signal SPWM2, the duty ratios are constant. That is, the brightness of the light source 132 is not changed in the embodiment, but the present disclosure is not limited thereto. For example, as shown in FIG. 2B, in the present disclosure, the brightness of the individual light-emitting units can also be controlled by adjusting the data signals DB1 and DB2.

Figure 6:
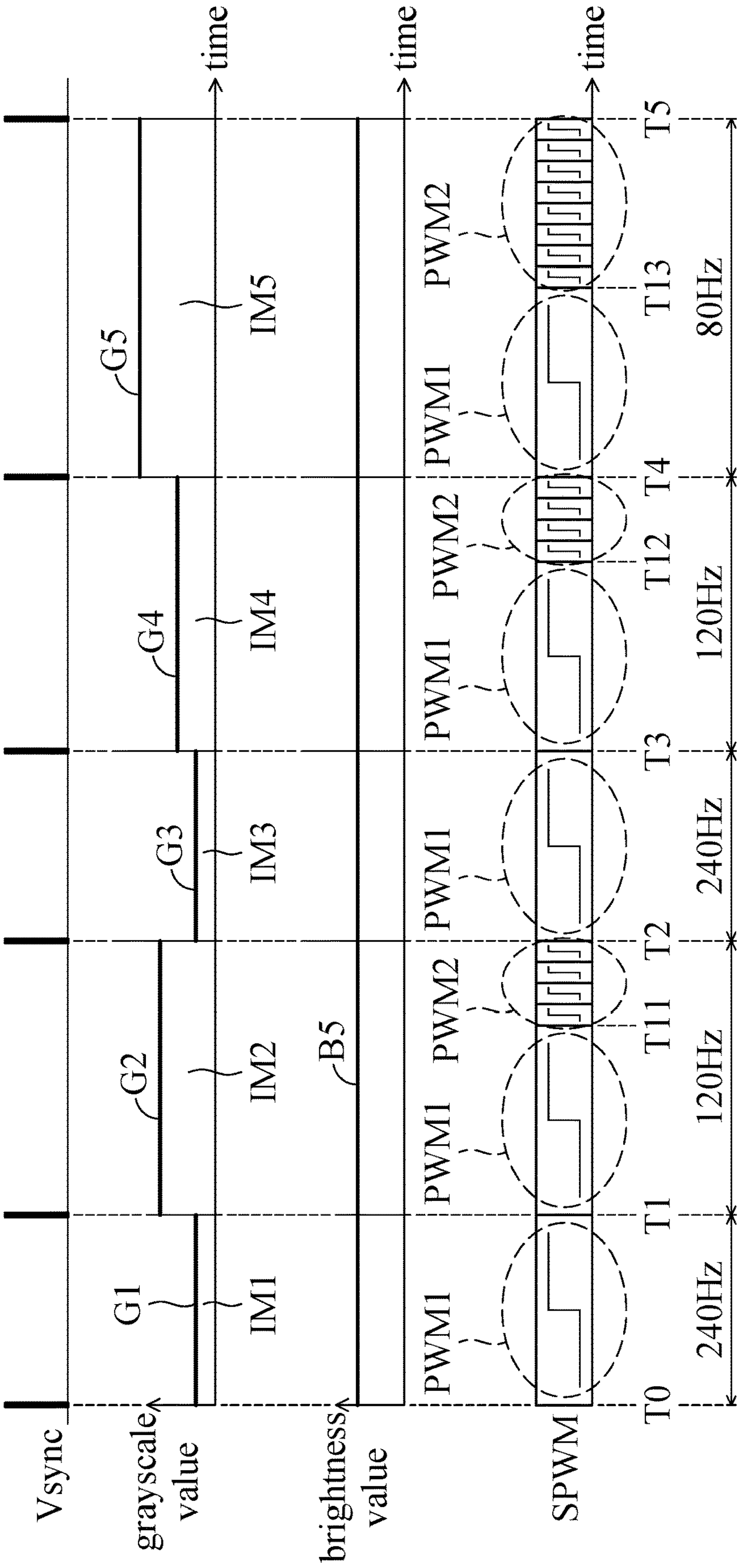
FIG. 6 is another schematic diagram showing refresh sequences of a display panel and a backlight module of the present disclosure.

FIG. 6 is a schematic diagram of another refresh sequence of the display panel and the backlight module of the present disclosure. At the time points T0~T5, the vertical synchronization signal Vsync is enabled. Therefore, the display panel 120 sequentially displays images IM1-IM5 according to the group of display signals DG1. Since the change in the grayscale values of the display panel 120 in FIG. 6 is similar to that in FIG. 4A, the related description will not be repeated here.

As shown in FIG. 6, at the time point T0, the vertical synchronization signal Vsync is enabled. Therefore, the display panel 120 presents the image IM1 according to the group of display signals DG1, and the light source 132 emits light according to the pulse width modulation signal SPWM provided by the light source controller 632 so that the brightness of the light source 132 has a brightness value of B5.

In the embodiment, the highest panel frequency of the display panel 120 may be 240 Hz, but the present disclosure is not limited thereto. At the time point T1, the vertical synchronization signal Vsync is enabled again so that the display panel 120 refreshes the displayed content again. Since the display panel 120 refreshes the displayed content at the highest panel frequency of 240 Hz during the period between the time points T0 and T1, the interval between the time points T0 and T1 is 1/240 seconds. During the same period, the light source controller 632 provides only the first pulse width modulation signal SPWM1 to cause the light source 132 to refresh the brightness at the first frequency. The refreshed brightness is kept at the brightness value B5.

At the time point T2, the vertical synchronization signal Vsync is enabled again so that the display panel 120 refreshes the display content again. In the embodiment, since the display panel 120 refreshes the displayed content at a relatively low frequency of 120 Hz during the period between the time points T1 and T2, the interval between the time points T1 and T2 is 1/120 seconds. As the previous description, 1/240 seconds between the time points T11 and T2 is the difference between the time interval for refreshing the displayed content (the time interval between the time points T1 and T2) and the time length of the first pulse width modulation signal SPWM1 (the time interval between the time points T1 and T11). Therefore, the light source controller 632 provides the second pulse width modulation signal SPWM2 continuously. In the embodiment, the second frequency may be (but not limited to) 960 Hz, so four pulses of the second pulse width modulation signals SPWM2 (1/960×4=1/240) are included in the interval between the time points T11 and T2 for refreshing the brightness of the light source 132. In other words, during the period between the time points T1 and T2, the light source 132 refreshes the brightness five times in total, wherein the light source 132 performs the first brightness refreshing according to the first pulse width modulation signal SPWM1, and then performs the brightness refreshing four times according to the second pulse width modulation signal SPWM2.

At the time point T3, the vertical synchronization signal Vsync is enabled again so that the display panel 120 refreshes the display content again. Since the display panel 120 refreshes the displayed content at the highest panel frequency of 240 Hz during the period between the time points T2 and T3, the interval between the time points T1 and T2 is 1/240 seconds, and the light source controller 632 provides only the first pulse width modulation signal SPWM1 to cause the light source 132 to refresh the brightness.

At the time point T4, the vertical synchronous signal Vsync is enabled again so that the display panel 120 refreshes the displayed content. Similar to the case during the period between the time points T1 and T2, since the display panel 120 refreshes the display content at a relatively low frequency of 120 Hz during the period between the time points T3 and T4, four pulses of the second pulse width modulation signals SPWM2 are included in the interval between the time points T12 and T4. Thus, the light source 132 refreshes the brightness five times during the period between the time points T3 and T4.

At the time point T5, the vertical synchronization signal Vsync is enabled again so that the display panel 120 refreshes the displayed content. Since the display panel 120 refreshes the display content at a relatively low frequency of 80 Hz. According to the above description, it can be understood that eight pulses of the second pulse width modulation signals SPWM2 (1/960×8=1/140) are included in the interval (1/120 seconds) between the time points T13 and T5 so that the brightness of the light source 132 is refreshed nine times during the period between the time points T3 and T4.

According to the above embodiment, the display panel 120 and the light source 132 can refresh the display content and brightness according to the variable refresh rates respectively, and the second refresh sequence defined by the process of switching the refresh rates for the brightness of the light source 132 is different from the first refresh sequence defined by the process of switching the refresh rates for the content displayed on the display panel 120. In the embodiment, the refresh rates of the first refresh sequence are 240 Hz, 120 Hz, 240 Hz, 120 Hz and 80 Hz in sequence, and the refresh rates of the second refresh sequence 240 Hz, 960 Hz, 240 Hz, 960 Hz, 240 Hz, and 960 Hz. In this case, when the refresh rate of the first refresh sequence is 240 Hz, the light source 132 refreshes the brightness according to one pulse of the first pulse width modulation signal SPWM1 with 240 Hz; when the refresh rate of the first refresh sequence is 120 Hz, the light source 132 refreshes the brightness according to one of the first pulse width modulation signal SPWM1 with 240 Hz and four pulses of the second pulse width modulation signal SPWM2 with 960 Hz, that is, the light source 132 refreshes the brightness four times; when the refresh rate of the first refresh sequence is 80 Hz, the light source 132 refreshes the brightness according to one of the first pulse width modulation signal SPWM1 with 240 Hz and right pulses of the second pulse width modulation signal SPWM2 with 960 Hz, that is, the light source 132 refreshes the brightness nine times.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device comprising:

a display panel;

a light source disposed corresponding to the display panel; and a timing controller electrically connected to the display panel and the light source, wherein the display panel refreshes a displayed content according to a first signal generated by the timing controller, the light source refreshes a brightness according to a second signal generated by the timing controller, the light source begins refreshing the brightness at a first time point, the display panel begins refreshing the displayed content at a second time point, and the first time point is different from the second time point.

2. The electronic device as claimed in claim 1, wherein the first time point is later than the second time point.

3. The electronic device as claimed in claim 1, wherein the display panel comprises: a source driver, configured to generate a plurality of data signals.

4. The electronic device as claimed in claim 1, wherein a number of light-emitting units of the light source is less than a number of pixels of the display panel.

5. The electronic device as claimed in claim 1, wherein the display panel has a maximum panel frequency that is a highest image refresh rate, the light source comprises a pulse width modulation signal with a frequency, and the frequency of the pulse width modulation signal is higher than the maximum panel frequency of the display panel.

6. The electronic device as claimed in claim 5, wherein the frequency of the pulse width modulation signal is 960 Hz.

7. The electronic device as claimed in claim 5, wherein the maximum panel frequency of the display panel is 240 Hz.

8. The electronic device as claimed in claim 1, wherein the first signal comprises a plurality of first refresh rates.

* * * * *